United States Patent
Weinstein et al.

(10) Patent No.: US 10,574,658 B2
(45) Date of Patent: *Feb. 25, 2020

(54) INFORMATION SECURITY APPARATUS AND METHODS FOR CREDENTIAL DUMP AUTHENTICITY VERIFICATION

(71) Applicant: Lookingglass Cyber Solutions, Inc., Reston, VA (US)

(72) Inventors: Steven Weinstein, Baltimore, MD (US); Jason Lewis, Baltimore, MD (US); Douglas Parker, Owings Mills, MD (US)

(73) Assignee: Lookingglass Cyber Solutions, Inc., Reston, VA (US)

( * ) Notice: Subject to any disclaimer, the term of this patent is extended or adjusted under 35 U.S.C. 154(b) by 339 days.

This patent is subject to a terminal disclaimer.

(21) Appl. No.: 15/811,946

(22) Filed: Nov. 14, 2017

(65) Prior Publication Data

US 2018/0083974 A1 Mar. 22, 2018

Related U.S. Application Data

(63) Continuation of application No. 15/019,259, filed on Feb. 9, 2016, now Pat. No. 9,871,797.

(51) Int. Cl.
*H04L 29/06* (2006.01)
*G06F 17/00* (2019.01)
(Continued)

(52) U.S. Cl.
CPC ........ *H04L 63/101* (2013.01); *G06F 16/9014* (2019.01); *G06F 17/00* (2013.01);
(Continued)

(58) Field of Classification Search
CPC . H04L 63/101; H04L 63/083; H04L 63/1408; H04L 63/1425; G06F 16/9014;
(Continued)

(56) References Cited

U.S. PATENT DOCUMENTS

| | | | |
|---|---|---|---|
| 7,353,536 B1* | 4/2008 | Morris | G06F 21/31 709/203 |
| 7,730,540 B1 | 6/2010 | Woirhaye et al. | |

(Continued)

OTHER PUBLICATIONS

Extended Search Report for European Application No. 17155497.5, dated Apr. 5, 2017, 7 pages.
(Continued)

*Primary Examiner* — Jahangir Kabir
(74) *Attorney, Agent, or Firm* — Cooley LLP

(57) ABSTRACT

In some embodiments, an apparatus includes a memory, storing processor-executable instructions, blacklist terms, and credential dump records, and a processor. The processor receives repository data from targeted remote repositories and stores the repository data as a potential credential dump in the memory when the repository data includes a credential dump attribute. The processor stores the potential credential dump as a probable credential dump when the potential credential dump does not include a blacklist term, in which case the processor also detects a format and delimiter of the probable credential dump. Based on the format and delimiter, pairs of usernames and associated passwords are identified and hashed. If a percentage of the hashes not associated with the credential dump records exceeds a predetermined threshold, the probable credential dump is deemed authentic.

17 Claims, 8 Drawing Sheets

(51) Int. Cl.
*G06F 21/00* (2013.01)
*G06F 21/31* (2013.01)
*G06F 16/901* (2019.01)
*G06F 16/951* (2019.01)

(52) U.S. Cl.
CPC ............ *G06F 21/00* (2013.01); *H04L 63/083* (2013.01); *H04L 63/1408* (2013.01); *H04L 63/1425* (2013.01); *G06F 16/951* (2019.01); *G06F 21/31* (2013.01)

(58) Field of Classification Search
CPC ........ G06F 21/00; G06F 17/00; G06F 16/951; G06F 21/31
USPC .................................................... 726/4–7, 25
See application file for complete search history.

(56) References Cited

U.S. PATENT DOCUMENTS

| | | | |
|---|---|---|---|
| 8,490,162 B1* | 7/2013 | Popoveniuc | ........ H04L 63/1433 726/5 |
| 8,495,384 B1 | 7/2013 | Deluccia | |
| 9,379,896 B1 | 6/2016 | Altman | |
| 9,396,322 B2* | 7/2016 | Chougle | ............... H04L 63/123 |
| 2003/0110385 A1 | 6/2003 | Golobrodsky et al. | |
| 2005/0131905 A1* | 6/2005 | Margolus | ............ G06F 21/6272 |
| 2005/0235041 A1* | 10/2005 | Salamuniccar | ......... H04L 51/28 709/206 |
| 2006/0059173 A1 | 3/2006 | Hirsch et al. | |
| 2013/0246378 A1 | 9/2013 | Hearnden et al. | |
| 2015/0178264 A1 | 6/2015 | Liu et al. | |
| 2016/0173521 A1 | 6/2016 | Yampolskiy | |
| 2017/0230372 A1 | 8/2017 | Weinstein et al. | |

OTHER PUBLICATIONS

Butler, Blake et al., "REAPER: An automated Scalable Solution for Mass Credential Harvesting and OSINI," 2016 APWG Symposium on Electronic Crime Research (ECrime), ISBN: 978-1-5090-2922-8, Jun. 1, 2016, 10 pages.

Volatile Internet evidence extraction from Windows systems, Joseph et al, 10.1109/ICCIC.2014.7238452, IEEE, 2014.

* cited by examiner

```
lhend******573@comcast.net:jaclyn1104                    670
ke******7@gmail.com:Johnnyd02
j******s@gmail.com:snake2014
kell******lipps@yahoo.com.au:unikitty9999
la******74@gmail.com:220781timmyninja
co*****22@gmail.com:junior123
km******ty1@comcast.net:balor7
j******01@hotmail.com:jutnur123
kot******ynes@gmail.com:meda2kotryna
e******e@live.dk:rooney10
ji******is@gmail.com:56f88de100
eli******ost@gmail.com:Momispretty1
ka******be@freenet.de:DamianLovis
ma******ov@yandex.com:darksousadmiralmark73rus
l******9@gmail.com:teemo1
fu******icken300@hotmail.com:popchop88
```

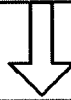

```
lhend******573@comcast.netjaclyn1104                     671
ke******7@gmail.comJohnnyd02
j******s@gmail.comsnake2014
kell******lipps@yahoo.com.auunikitty9999
la******74@gmail.com220781timmyninja
co*****22@gmail.comjunior123
km******ty1@comcast.netbalor7
j******01@hotmail.comjutnur123
kot******ynes@gmail.commeda2kotryna
e******e@live.dkrooney10
ji******is@gmail.com56f88de100
eli******ost@gmail.comMomispretty1
ka******be@freenet.deDamianLovis
ma******ov@yandex.comdarksousadmiralmark73rus
l******9@gmail.comteemo1
fu******icken300@hotmail.compopchop88
```

```
3194a3e7d346609e06e3739a04582988aa6233b2942e9c84ad2d0875d49d0658   672
172d174a3f534af9e2cc0b92fcf65991f4f63f41a72974304fec5ddf5e6a1c56
12621d08773cb8bee7fa16829028c49133379e5b80294949a13b3fa1e6462ced
05b9cf37cabd3ffcd6916b24a119b2d72411d36d55c96169e94c0323f7ae33b1
0694f4f7b61a0c4989d00591c03eaf1df96c3fa7431cf9c10b708af0dc949208
e3ef4e6b42ff84d3a1271e8c52a62925f760cd2a2a5739df66ad7b7de7d85e2b
42f8d8aba47ff9cde05b90d19c05c6a8fb5b85b3eb3005943e8ae8dd9b8c522c
c8f186e701f3957bc6e0e86e748fe68b69e8148aa06106960afe01cb6eed64ef
3e9e43807a036884cbc4da21fa96e391f59cc1492f857eb81218d92b4180651c
a44ddbcbc54e54177e5d0998c987ad22affed86fe2645c6c064402e513f945f2
c0fdb8f66b95c9b58bc6a3b911dba09b453e1f5c934038f3b779db3d7892f1d1
072fd597fad7298a4fa548a73260dac6a602eb5359b15c837925ab546c9f7269
5c6891be473a33e3ffd006999e1c7a9eb238f8302449dc7b19e4f94b68ac2cf2
8795f1d6b653c35598461bfbc82fea9328d043a5965879e0c3f8228847301baa
b7e8f7169c3b72e863529de781a9ced22deb01a897b2d493b06c1311df59090a
730efebe6abbd03daf7fa8eb2918c77838608a7a81719828b32de4ad45327b9b
```

```
[*] Of 28 username and password combinations seen in other dumps, 14.3% (4)
are seen in Gmail Dump 5Mil Sept092014
[*] Of 28 username and password combinations seen in other dumps, 42.9% (12)
are seen in Passwords Found on VirusTotal -
09abf2ee3bf951cbd23beb8efdc6086e361041931a02dd4f420badd23368f07c
Oct262015
[*] Of 28 username and password combinations seen in other dumps, 28.6% (8)
are seen in Passwords Found on VirusTotal -
1a9df37b38c82a5ed58b8da9422c81ffcf63166c394d143338a4a0b694eca2e6
Oct262015
[*] Of 28 username and password combinations seen in other dumps, 14.3% (4)
are seen in Passwords Found on VirusTotal -
8affb00e5d75f5d1d0b642ba6c390b087e964b57573857ea6de7fe7a1258572b
Oct262015                                                        673
```

INFORMATION SECURITY APPARATUS AND METHODS FOR CREDENTIAL DUMP AUTHENTICITY VERIFICATION

CROSS-REFERENCE TO RELATED APPLICATIONS

This application is a continuation of U.S. patent application Ser. No. 15/019,259, entitled "Information Security Apparatus and Methods for Credential Dump Authenticity Verification," filed on Feb. 9, 2016, which is incorporated herein by reference in its entirety.

This application may contain material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

One or more embodiments described herein relate generally to apparatuses, methods and systems for information security (IS), and more particularly, to the authenticity verification of credential dumps.

BACKGROUND

Many types of malicious code used by computer system hackers are designed to steal or harvest user credentials, such as email addresses and passwords, either found on users' infected machines or coerced from the users themselves. Additionally, hackers commonly breach a service or website to obtain the credentials for users of that service. The resulting collections of stolen credentials are often uploaded to various places on the Internet, at which point they are referred to as credential dumps. In other words, a credential dump is a list of usernames and passwords for a set of users that have been posted on the Internet by a third party, typically by malicious third-party for nefarious purposes by different third parties.

SUMMARY

Apparatus and methods described herein determine whether data received from a remote repository constitutes an authentic credential dump. As used herein, an "authentic" credential dump is one whose data was obtained via a "new" or recent data breach not previously identified or known by the investigating entity; in such a situation, the authenticity of the credential dump is verified by the apparatus and methods described herein. In some embodiments, an apparatus includes a memory, storing processor-executable instructions; blacklist terms and credential dump records, and a processor. The processor receives repository data from targeted remote repositories and stores the repository data as a potential credential dump in the memory when the repository data includes a credential dump attribute. The processor stores the potential credential dump as a probable credential dump when the potential credential dump does not include a blacklist term, in which case the processor also detects a format and delimiter of the probable credential dump. Based on the format and delimiter, pairs of usernames and associated passwords are identified and hashed. If a percentage of the hashes not associated with the credential dump records exceeds a predetermined threshold, the probable credential dump is deemed authentic.

BRIEF DESCRIPTION OF THE DRAWINGS

FIGS. 6A-6B show the processing of probable credential dump data, according to an embodiment.

DETAILED DESCRIPTION

Figure 1:
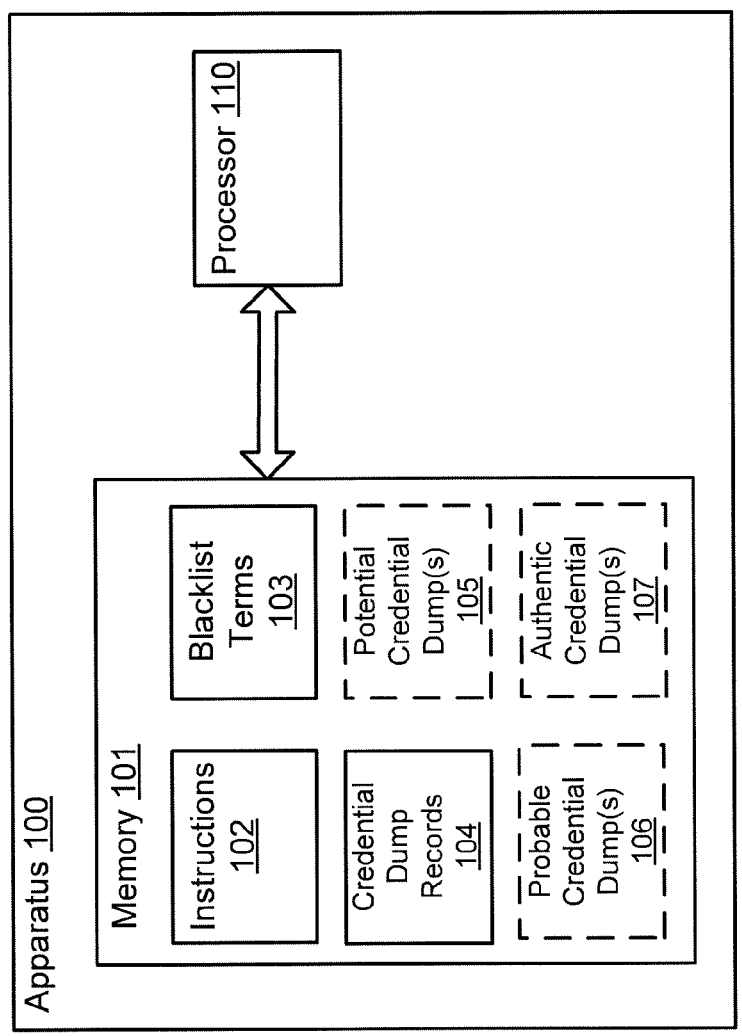
FIG. 1 is a system block diagram of a credential dump authenticity verification apparatus, according to an embodiment.

Embodiments described herein relate generally to apparatuses, methods and systems for information security (IS), and more particularly, to the authenticity verification of credential dumps. Credential data includes user-identifying data, such as usernames, email addresses, biometric identifiers, etc., together with associated password data (collectively, "credentials"). Biometric identifiers can include, for example, fingerprints, facial recognition data, palm vein data, DNA data, palm print data, hand geometry data, iris recognition data, retinal scans, scent detection data, and/or the like. Hackers of computer systems/networks often use malicious code and/or other techniques to gather collections of credential data, and then "dump" that data in one or more data repositories that may be publicly accessible (e.g., via the Internet) in what is known as a "credential dump." These hackers, or "threat actors," often make claims that they have breached a new service or website, and post sample credential dumps to "prove" their work. When a purported (or "potential," "possible," "suspected," etc.) credential dump is discovered or detected, for example by the IT department of a corporation, considerable time and resources may be consumed investigating the legitimacy of the purported credential dump to determine whether an intrusion into their computer systems has occurred and/or the magnitude of the intrusion, whether customer or other sensitive data has been compromised, whether customers need to be notified, etc. A legitimate (or authentic) credential dump is one whose data was obtained via a "new" data breach not previously identified or known by the investigating entity. A legitimate credential dump may also be one that contains valid or once-valid credential data. Modifications to IS infrastructure in response to a purported credential dump can result in periods of computer system downtime/unavailability and slower or less efficient computer system operation, and can be very costly. In addition to the various direct costs involved, notifying customers of data breaches when they are not legitimate can result in the unnecessary loss of valuable goodwill.

An exemplary system described herein is capable of efficiently and automatically identifying potential credential dumps, as well as automatically analyzing the data (e.g., credential pairs) within a potential credential dump to determine its authenticity or legitimacy, freeing up time and resources (e.g., computer resources and human resources). In other words, the system determines whether the credential dump is real (e.g., contains valid data) and is indicative of a fresh (i.e., new or not previously known) data breach or compromise, or if it is counterfeit and/or uses previously-identified credentials. In some embodiments described herein, determining the authenticity of a credential dump takes only a few seconds. For example, a credential dump with ~1,000 credential pairs may take 2-3 seconds, a credential dump with ~10,000 credential pairs may take ~30 seconds, and a credential dump with ~100,000 credential pairs may take 3-5 minutes. Systems and methods described herein reduce the impacts of suspected credential dump detections by determining the authenticity of suspected credential dump data to confirm that the above-noted resource expenditures and corrective actions within the computer system (e.g., incident response processes, such as re-imaging computers, wiping the hard drive, running additional malware or antivirus software, contacting customers to request that they reset their passwords, etc.) are warranted before they are incurred or implemented. For example, if an organization identifies that one of their employees or users' credential information has been found in a potential credential dump, the system can give an indication regarding the authenticity of the dump and its potential impact on the organization. This helps the organization to quickly determine the priority of investigation and remediation efforts, to minimize impact on the efficient and uninterrupted operation of computer systems, and to allow security professionals to focus on the security events that matter.

In some embodiments, an apparatus includes a memory storing processor-executable instructions, a set of blacklist terms associated with an instruction to ignore data, and a set of credential dump records. Each credential dump record from the set of credential dump records includes an associated hash value, or "hash" that has been generated, for example, using a one-way hash algorithm, such as Secure Hash Algorithm (SHA-X). The apparatus also includes at least one processor that is operably coupled to the memory. The processor is configured to communicate with one or more remote data repositories, and to execute the processor-executable instructions. For example, the processor is configured to receive repository data from a set of targeted remote repositories. The repository data is stored as a potential credential dump in the memory when the repository data includes a credential dump attribute. The potential credential dump is stored as a probable credential dump when the potential credential dump does not include a blacklist term from the set of blacklist terms. The processor is also configured to detect a common format of the probable credential dump and a common delimiter of the probable credential dump, and to identify a set of pairs of usernames and associated passwords of the probable credential dump based on the common format and the common delimiter. The processor generates a hash for each pair of usernames and associated passwords from the set of pairs of usernames and associated passwords to produce a set of hashes. The set of hashes is compared to the set of credential dump records stored in the memory to determine a percentage of the set of hashes that are not associated with the credential dump records. The processor sends a signal indicating that the probable credential dump is an authentic credential dump if the percentage is larger than a predetermined threshold.

In some embodiments, a method comprises receiving, via a processor, remote source data from a set of targeted remote sources, and storing (1) a set of credential pairs of the remote source data and (2) metadata associated with the set of credential pairs in a memory that is operably coupled to the processor. The processor normalizes the set of credential pairs into a concatenated, delimiter-free format (see, e.g., block 671 of FIG. 6A), and converts the normalized set of credential pairs into a set of hashes (see, e.g., block 672 of FIG. 6B). The processor then compares the set of hashes to previously-collected credential dump data to determine a percentage of the set of hashes that are not included in the previously-collected credential dump data. If the percentage of the set of hashes that are not included in the previously-collected credential dump data is larger than a predetermined threshold, the processor sends a signal indicating that the remote source data includes an authentic credential dump.

Turning now to FIG. 1, a system block diagram of a credential dump authenticity verification apparatus, according to an embodiment, is shown. The apparatus 100 includes a memory 101 operably coupled to and in communication with a processor 110. The memory 101 includes processor-executable instructions 102, a set of blacklist terms 103, and a set of credential dump records 104. The memory 101 may also include one or more potential credential dumps 105, one or more probable credential dumps 106 and/or one or more authentic credential dumps 107 that are generated during processing performed by the processor 110. Potential credential dumps 105 include data received by the apparatus 100 that is determined, via the processor 110, to include a credential dump attribute. Probable credential dumps 106 include data received by the apparatus 100 that is determined, via the processor 110, not to include a blacklist term. Authentic credential dumps 107 include data received by the apparatus 100 that, once processed by the processor 110 (e.g., converted to hashes, as discussed further below with reference to FIGS. 3B, 4 and 6A-6B), is determined to include more than a predetermined threshold number or percentage of credential pairs or combinations that have not previously been identified by the apparatus 100.

Credential data that has been dumped to a publicly-accessible repository, such as a website, is retrieved or downloaded by the apparatus 100, which stores its own copy of the credential data as one or more credential dump records 104. The credential dump records 104 may include user-identifying data (such as usernames, email addresses, account numbers, Uniform Resource Locators (URLs), Internet Protocol (IP) addresses, etc.) and associated passwords or other credential data. The credential dump records 104 may be stored in the memory 100 as a result of previous identifications of legitimate credential dumps. Each credential dump record of the set of credential dump records 104 may be associated with a hash (e.g., an SHA hash, as noted above and as discussed in greater detail below).

The blacklist terms 103 are keywords, strings or files that are known not to be included in credential dumps. Examples of blacklist terms 103 include emails or portions thereof, email headers or portions thereof; Simple Mail Transfer Protocol (SMTP) headers, system log files (or portions thereof) that include email addresses, etc. Blacklist terms 103 may be associated with an instruction (of the instructions 102) to ignore the data in a purported credential dump if that blacklist term is present in the purported credential dump. For example, a lengthy email chain includes numerous email addresses, but may not constitute, or qualify as, a credential dump. To rule out incorrectly identifying an email as a credential dump, the blacklist terms 103 may include a blacklist keyword that is associated with an email header, such as a Multipurpose Internet Mail Extension (MIME)

header. Examples of MIME headers include MIME-Version (the presence of which indicates that the message is MIME-formatted), Content-Type (which indicates a "media type" of a message, such as plain text, text with attachments, image file, etc.), Content-Disposition (which indicates a presentation style of the message, such as inline or attachment), and Content-Transfer-Encoding (which specifies an encoding of the message, such as 8-bit or binary). A blacklist keyword may therefore may include one or more of "MIME-Version," "Content-Type," "Content-Disposition" and "Content-Transfer-Encoding," such that if the blacklist term appears in a credential dump record 104, the apparatus 100 may deem the credential dump record 104 not to be an authentic credential dump, and delete/discard it.

The processor-executable instructions 102 may include one or more instructions to: receive repository data from a set of targeted remote repositories; store the repository data as a potential credential dump in the memory when the repository data includes a credential dump attribute; store the potential credential dump as a probable credential dump when the potential credential dump does not include a blacklist term from the set of blacklist terms; detect a common format of the probable credential dump and a common delimiter of the probable credential dump; identify a set of pairs of usernames and associated passwords of the probable credential dump based on the common format and the common delimiter; generate a hash for each pair of usernames and associated passwords from the set of pairs of usernames and associated passwords to produce a set of hashes (e.g., using a SHA hash function such as SHA-256); compare the set of hashes to the set of credential dump records stored in the memory to determine a percentage of the set of hashes that are not associated with the credential dump records; and/or send a signal indicating that the probable credential dump is an authentic credential dump if the percentage is larger than a predetermined threshold.

In some embodiments, the memory 101 also stores one or more targeted websites from which potential credential dump data is to be retrieved, and/or a list of credential dump attributes (discussed further below with reference to FIG. 3A).

Figure 2:
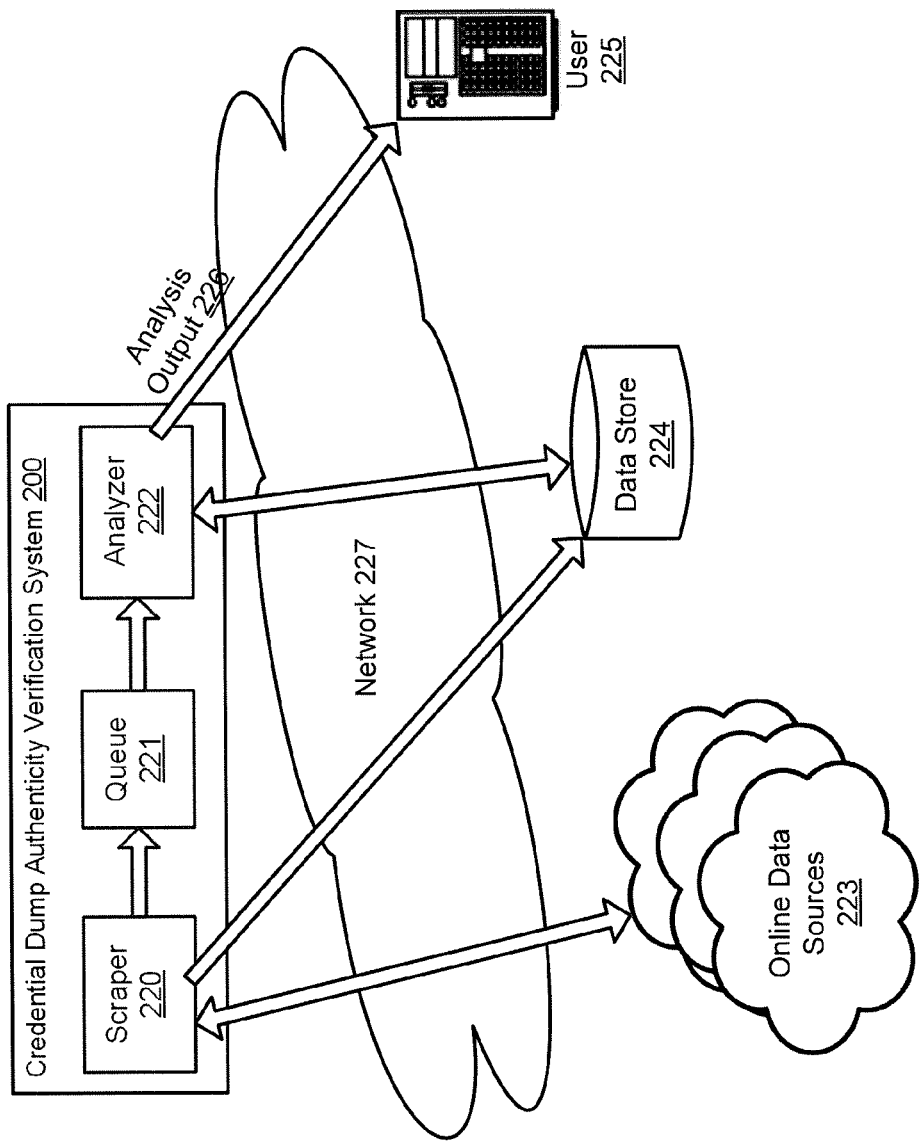
FIG. 2 is a system block diagram of a credential dump authenticity verification system, according to another embodiment.

FIG. 2 is a system block diagram of a credential dump authenticity verification system, according to an embodiment. The credential dump authenticity verification system 200 includes a scraper 220 to identify potential credential dumps, an analyzer 222 to perform authenticity analysis, and a queue 221 between the scraper 220 and the analyzer 222 in which potential credential dumps await analysis by the analyzer 222. The credential dump authenticity verification system 200 is compatible with the apparatus of FIG. 1. For example, the scraper 220, queue 221 and analyzer 222 may be implemented in the processor 110. The credential dump authenticity verification system 200 can communicate via a wired and/or wireless communications network 227 (e.g., the Internet or "the cloud," a local area network (LAN), a wide area network (WAN),) with one or more online data sources 223 (or "targeted remote repositories"), a data store 224, and a user 225.

The scraper 220 monitors several online file repositories or sources 223, and retrieves data from the sources 223, for example via web scraping. Web scraping is a computer software technique that programmatically or automatically extracts information from web pages. Alternatively or in addition to web scraping, an application program interface (API) can be used to extract data (including web pages and other data) from sources 223. In some implementations, the scraper 220 monitors the sources 223 automatically (e.g., without user intervention or prompting by a user) and/or continuously. In other implementations, the scraper 220 monitors the sources 223 upon initiation (e.g., via input by a user, upon receipt of an alert message from a network-accessible source, etc.) and/or intermittently (e.g., according to a predetermined schedule). The online data sources 223 are targeted (for example, targeted websites) in that their identifier (e.g., address) information is stored in the data store 224, for example upon entry by an analyst. Analysts can input one or more online data sources 223 (e.g., a list of websites) into the data store 224 that are known by the Analyst, the IS community or entities within the organization to previously have been used for credential dump posting. Although shown in FIG. 2 to be accessible to the credential dump authenticity verification system 200 via the network 227, the data store 224 can, alternatively or in addition, be stored within the credential dump authenticity verification system 200 itself.

The scraper 220 automatically (i.e., without user/human intervention) collects data of one or more potential credential dumps on the online data sources 223, retrieves all relevant data pertaining to the identified credential dumps (in some implementations excluding any data that is not related to the potential data dump, so as to avoid unnecessary processing), and stores the retrieved data in a data store 224 for subsequent analysis and/or places the retrieved data in the queue 221 for subsequent processing/analysis by the analyzer 222. Because of the various origins and techniques of credential collection by hackers, the credential clump output is often found in different types of formats. The scraper 220 is therefore dynamic in that it is configured to identify "standard" as well as "non-standard" formats (e.g., output from password-stealing malware, raw database dumps, etc.). In some embodiments, the scraper 220 is configured to receive data from the online data sources 223 at a predetermined rate, for example every 60 seconds, every 150 seconds, at random intervals (e.g., a time intervals having values that are selected randomly and that are between 60 seconds and 90 seconds), or at a rate that is dependent upon a constraint related to the online data source 223 itself (e.g., a collection rate of data from one of the online data sources 223 may be higher than for another one of the online data sources 223). Constraints related to the online data source 223 can include the frequency at which data is posted to the data source 223, as well as the number of data requests an online data source 223 permits within a given time period before blocking access to a requestor. For example, data can be received from a first online data source 223 at a first rate that is a function of the first online data source 223, and data can be received from a second online data source 223 at a second rate that is a function of the second online data source 223. Alternatively or in addition, the scraper 220 may be configured to receive data from the online data sources 223 when a change in content/data is detected at one or more of the online data sources 223.

The analyzer 222 retrieves the one or more potential credential dumps identified by the scraper 220 from the data store 224 or from the queue 221, and automatically detects its formatting and its delimiter before determining its authenticity. Once the analyzer 222 determines the formatting and the delimiter, it performs authenticity analysis by storing each "credential pair" (e.g., username and password, or email address and password) and their metadata, and checking against previously-stored credential pairs and their metadata in the data store 224. For example, the analyzer 222 proves or disproves that the potential credential dump is authentic by determining whether the credential pairs have been seen before. If the credential pairs have been seen before, the analyzer 222 determines that the potential credential dump is not authentic (i.e., is not "new"). In some embodiments, the analyzer 222 communicates its authenticity determination, via analysis output 226, to the user 225.

In some implementations, the analyzer 222 repeatedly checks the queue 221 for new potential credential dumps. In some cases, the first potential credential dump to enter the queue 221 is the first one to be analyzed (i.e., a "first-in, first out" scheme). The analyzer may also perform sub-filtering, for example to remove data other than the credential pairs, to track instances of unique credential pairs and/or duplicate credential pairs, etc.

Figure 3A:
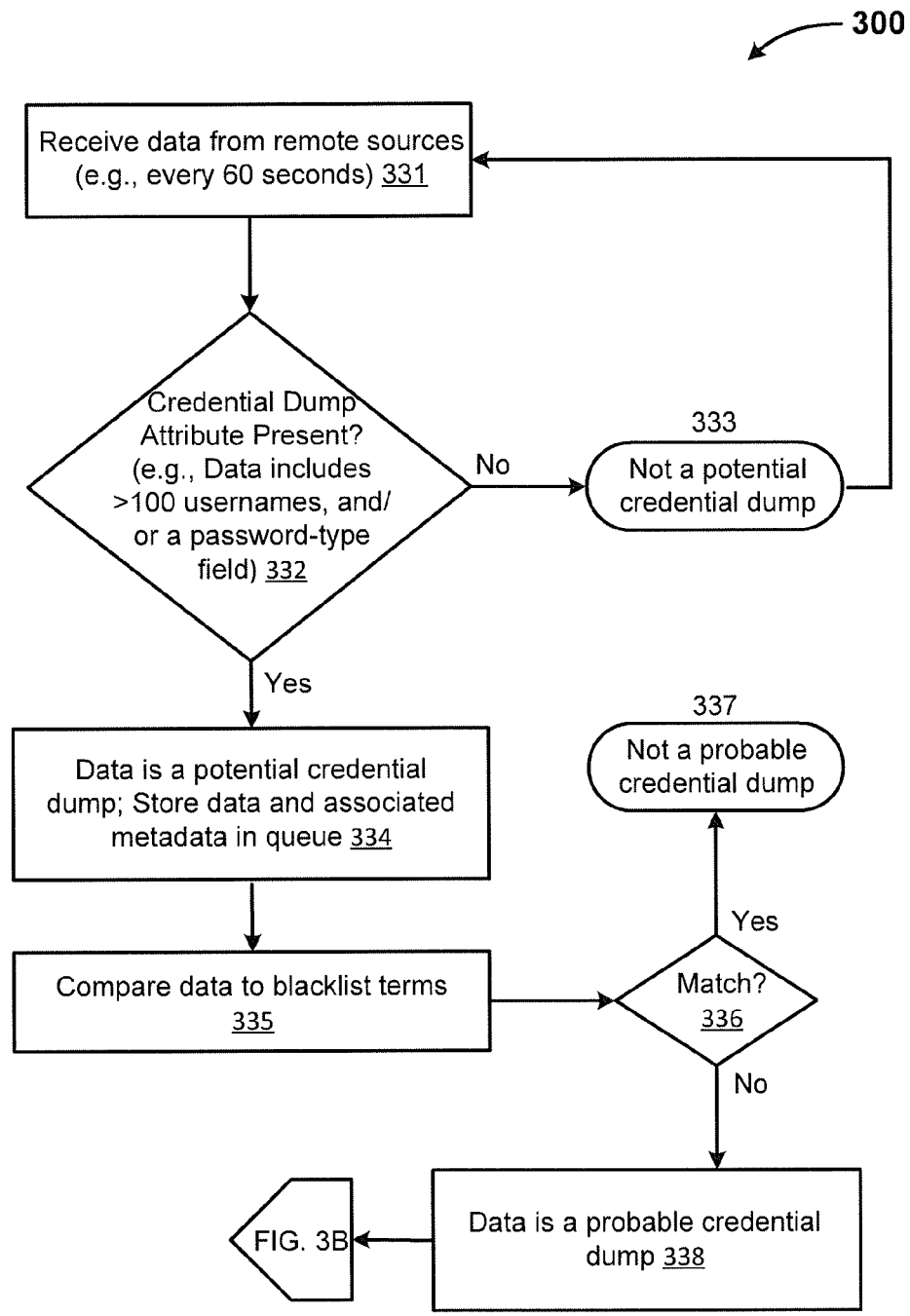
FIGS. 3A-3B are flow charts illustrating a method of credential dump authenticity verification, according to another embodiment.
Figure 3B:
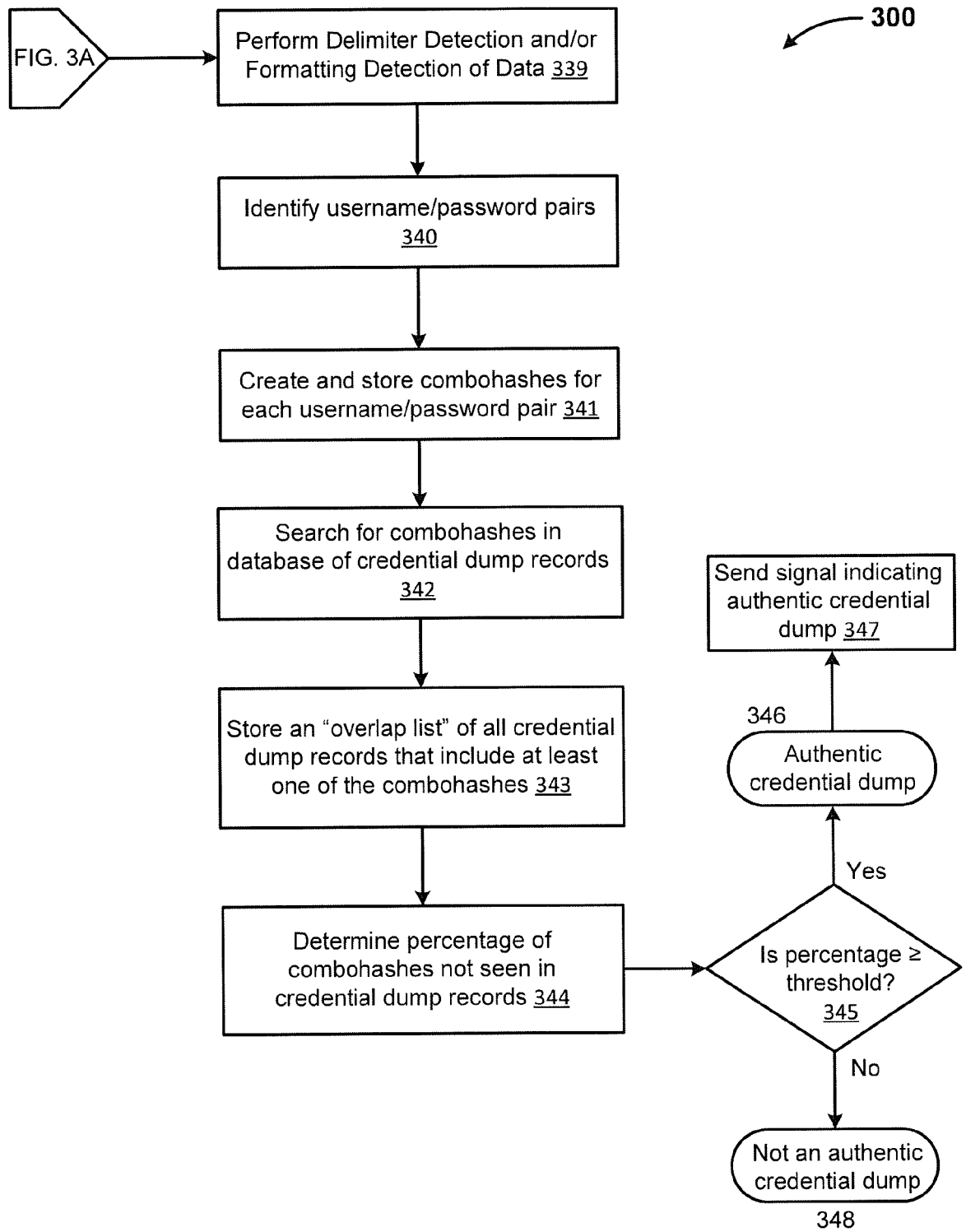

FIGS. 3A-3B are flow charts illustrating a method of credential dump authenticity verification (for example, performed by credential dump authenticity verification system 200 of FIG. 2), according to another embodiment. As shown in FIG. 3A, the method 300 includes receiving data from one or more remote sources at 331 (e.g., targeted remote sources where credential dumps are posted). In some implementations, the data is received periodically. For example, each new piece of data (i.e., files) that was posted in the past 60 seconds may be received every 60 seconds. In other implementations, the data is received at time intervals that are adjustable and/or customized based upon the remote source itself. For example, if a website blocks high frequency requests (i.e., above a nominal frequency), the access rate can be adjusted for that website so that the data is received at a frequency below the level at which data requests would be blocked. In still other implementations, the data is received at a non-periodic (e.g., random) rate.

Next, each file of the collected data is analyzed to determine whether a credential dump attribute is present 332. Credential dump attributes are attributes whose presence is indicative of the data being a potential credential dump, and include, for example: a number of times that a username or email address appears in the data (e.g., >100 instances) exceeding a predetermined threshold number thereof, the presence of a string such as "password," "pwd," "username," "username:password," "username;password," "username|password," or "username,password," etc. Credential dump attributes can also include the presence of one or more biometric identifiers, such as for example fingerprints, facial recognition data, palm vein data, DNA data, palm print data, hand geometry data, iris recognition data, retinal scans, scent detection data, etc. Credential dump attributes may be locally stored in memory (e.g., the memory 101 of FIG. 1). If no credential dump attribute is present in the data, the data is categorized as not a potential credential dump and is discarded at 333, and the method loops back to receiving a next batch of data at 331. If a credential dump attribute is present in the data, the data is categorized as a potential credential dump, and the data is stored in a location on disk (e.g., the queue 221 of FIG. 2), along with its associated metadata, in a queue at 334. In some embodiments, the metadata includes, for example: (i) an identifier of the source of the potential credential dump; (ii) the timestamp at which the potential credential dump was collected; and (iii) a description of the credential dump (automatically retrieved from the source, or automatically generated by the credential dump authenticity verification system if no description is available from the source). Potential credential dumps stored in the queue are, for example, the output of the scraper 220 of FIG. 2 and the input of the analyzer 222 of FIG. 2, which may check the queue (e.g., every 60 seconds, a time interval that is, optionally, adjustable) for new potential credential dumps to analyze. The data is then compared at 335 to blacklist terms that are known to not be included in credential dumps processed by the credential dump authenticity verification system, and which may be stored locally in memory as discussed above. If a match between the data and the blacklist terms is found at 336, the data is not a probable credential dump 337, and is discarded. If no match between the data and the blacklist terms is found, the data is categorized as a probable credential dump at 338, and the method 300 proceeds as shown in FIG. 3B.

The data is analyzed at 339 to detect a common delimiter and a formatting thereof. Delimiter detection is performed by automatically detecting which character separates the credential pair components from one another (e.g., the username from the password—usually ":", ";", ",", "|", or a single space " " or a tab " "). This is done by looping through each line of the file until a common delimiter is found on a predetermined number of consecutive lines (e.g., at least five, five, six, seven, eight, nine or ten lines). It is then assumed that the credential dump file uses the identified delimiter throughout its entirety. Instead of or in addition to detecting delimiters, the method may include detecting intervening terms, words, phrases, strings of characters, etc. between elements of credential pairs.

Format detection is performed by determining a pattern to the data in the probable credential dump. For example, such a pattern can be email address/username-delimiter-password, or password-delimiter-email address/username (e.g., email:password or password:email, given ":" as the delimiter). This format detection is done by looping through each line of the file and locating the position (index) of the email address in the line until a common position is found on a certain number of consecutive lines (e.g., a pre-determined number of lines, such as five lines or ten lines). In other words, for a given format, usernames of the consecutive lines of the probable credential dump are indexed at a first common index position, and passwords of the consecutive lines of the probable credential dump that are associated with the usernames are indexed at a second common index position. Then, the credential dump file can be assumed to use the identified format throughout its entirety.

Based on the detected common delimiter and format, credential pairs (e.g., username/email addresses and associated passwords) are identified at 340. Combohashes for each credential pair are then produced and stored in memory at 341. In some embodiments, producing (also "calculating" or "generating") a "combohash" includes concatenating the email address/username and password together (e.g., without an intervening delimiter), then calculating a hash (e.g., the SHA256 hash) of the concatenated string. For example, example@domain.com:password is concatenated to become example@domain.compassword, and the associated combohash is a87af8d2ebe15d90b94be0d59fa6e50492dae2d76be7136cd 2050c3d281f51ee. The generation of combohashes thus "normalizes" the data based on the common delimiter and format. The combohashes may be stored together with their associated metadata. Metadata can be defined and/or sorted in conjunction with the normalized data to allow different types of database searching/querying.

After all lines in the probable credential dump have been processed and all combohashes produced, the authenticity analysis is performed. The combohashes produced at 341 are used to query or search a database of credential dump records at 342 to determine which combohashes generated at 341 were previously identified as part of a credential dump and stored. An overlap list, including a unique set of all previously-identified credential dump records that include at least one of the combohashes produced at 341, is produced and stored at 343. For example, if a first combohash was previously identified, in previously-identified credential dumps A, B, and C, then credential dumps A, B, and C are added to the overlap list. The definition of an overlap list may result in the de-duplication of data. In some implementations, the number of occurrences of each credential dump in the overlap list is counted to determine how many combohashes were seen in each of the previously-identified credential dumps. For example, suppose that combohash "1" appears in previously-identified credential dumps A, B and C, combohash "2" appears in previously-identified credential dumps A, B and D, and combohash "3" appears in previously-identified credential dumps A and E. In such an instance, three combohashes appear in previously-identified credential dump A, two combohashes appear in previously-identified credential dump B, and one combohash appears in each of previously-identified credential dumps C, D and E. This is useful, for example, to show users that use they have used the same username/password combination for many websites, and they should be advised to change passwords, use different passwords for different sites, etc.

A percentage of the combohashes generated at 341 that were not previously identified in credential dump records is determined at 344 and compared with a predetermined threshold at 345. If the percentage is below the predetermined threshold, the data is deemed not to be an authentic credential dump at 348. If the percentage is at or above the predetermined threshold, the data is deemed to be an authentic credential dump at 346, and a signal is sent (e.g., from the credential dump authenticity verification system to a user) indicating that an authentic credential dump has been identified at 347. Although a percentage of the combohashes generated at 341 that were not previously seen in credential dump records is referenced at 344, any other statistic generated by the methods described herein and relating to the probable credential dump can be compared with a related threshold/metric to define authenticity.

Figure 4:
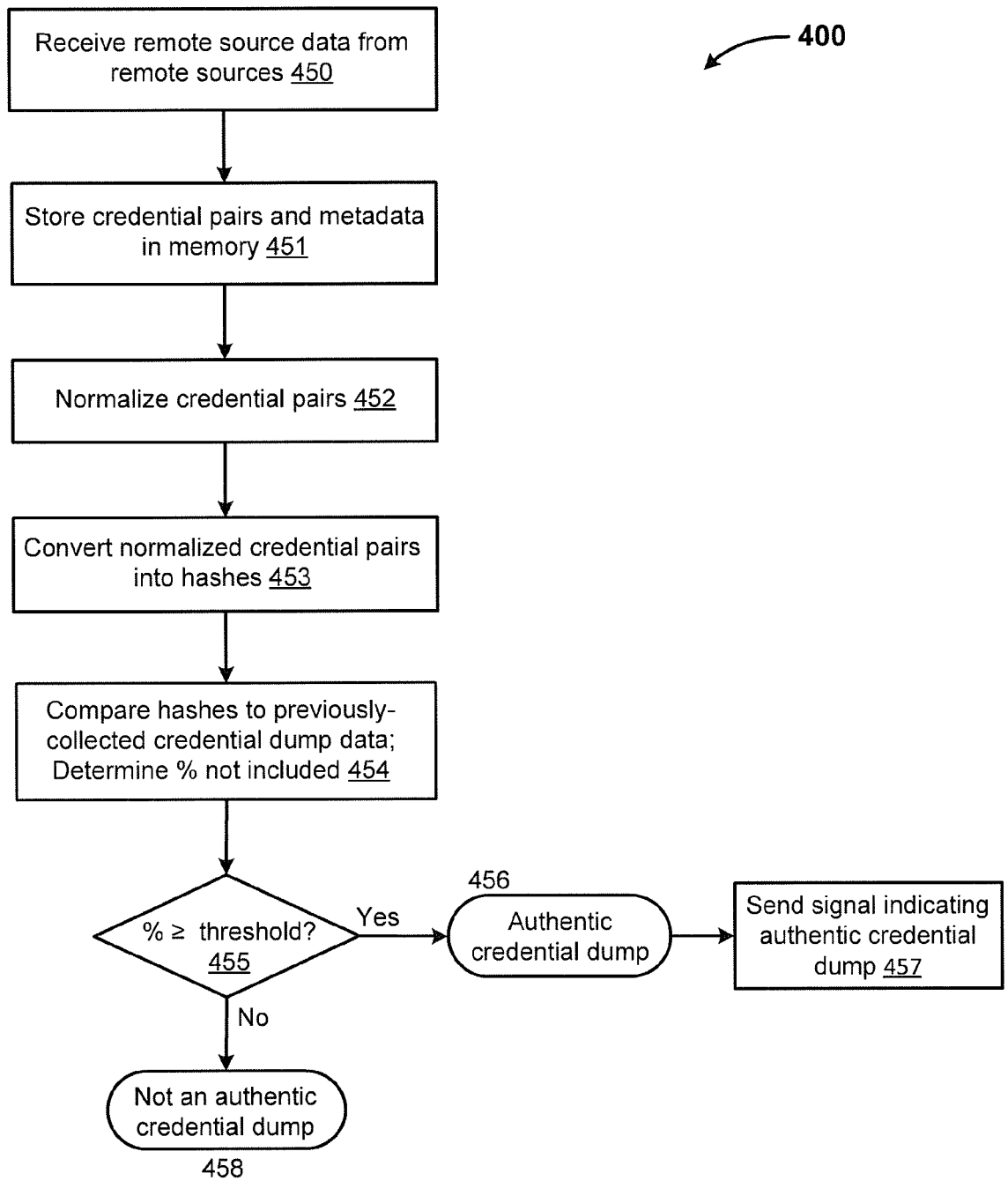
FIG. 4 is a flow chart illustrating a method of credential dump authenticity verification, according to another embodiment.

FIG. 4 is a flow chart illustrating a method of credential dump authenticity verification, according to another embodiment. As shown in FIG. 4, a method 400 includes receiving remote source data, including credential pairs and metadata, from remote sources at 450 (e.g., from targeted websites or other known locations where credential dumps are posted). The credential pairs and metadata are stored in memory at 451, and the credential pairs are normalized at 452, for example by modifying the credential pairs so that they have a common format or syntax throughout the received remote source data. The normalized credential pairs are converted into hashes at 453. The hashes are compared to previously-collected credential dump data (e.g., credential dump data that was previously determined to be authentic), and a percentage of the hashes that do not match the previously-collected credential dump data is calculated at 454. If the percentage is less than a predetermined threshold percentage value at 455, the received remote source data is determined not to be authentic, and may be discarded at 458. If the percentage is greater than or equal to the predetermined threshold percentage value, the received remote source data is determined to be authentic at 456, and a signal indicating this determination is sent at 457.

Figure 5:
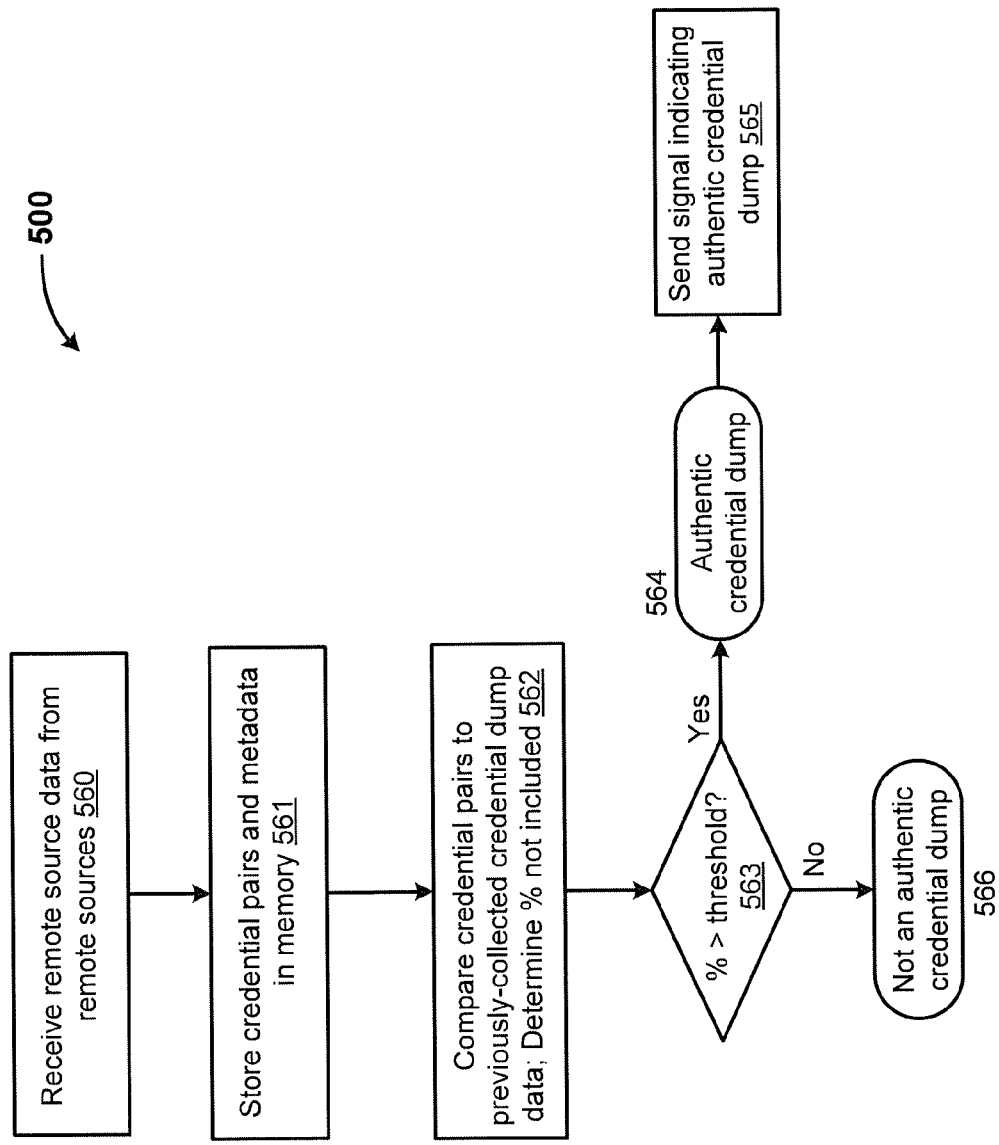
FIG. 5 is a flow chart illustrating a method of credential dump authenticity verification, according to another embodiment.

FIG. 5 is a flow chart illustrating a method of credential dump authenticity verification, according to another embodiment. As shown in FIG. 5, a method 500 includes receiving remote source data, including credential pairs and metadata, from remote sources at 560 (e.g., from targeted websites or other known locations where credential dumps are posted). The credential pairs and metadata are stored in memory at 561, and the credential pairs are compared to previously-collected credential dump data (e.g., credential dump data that was previously determined to be authentic), and a percentage of the credential pairs that do not match the previously-collected credential dump data is calculated at 562. If the percentage is less than a predetermined threshold percentage value at 563, the received remote source data is determined not to be authentic, and may be discarded at 566. If the percentage is greater than or equal to the predetermined threshold percentage value, the received remote source data is determined to be authentic at 564, and a signal indicating this determination is sent at 565.

FIGS. 6A-6B show the processing of probable credential dump data, according to an embodiment. Referring to FIG. 6A, block 670 shows an example of a listing of credential pairs (email addresses and passwords), separated by a common "colon" delimiter, of a probable credential dump. (Note that the email addresses shown in FIG. 6A have been modified with asterisks for purposes of maintaining privacy within the patent application.) Block 671 shows the credential data of block 670 after elimination of the common delimiter (i.e., normalized credential data). In other words, the email addresses and passwords of each credential pair are concatenated together. The lower box shows an example of a snippet of the output of the analyzer module. Turning now to FIG. 6B, block 672 shows a listing of hashes generated using the normalized credential data of block 671. Block 673 shows an example output showing statistics generated based on the hashes of block 672. The statistics of block 673 describe the frequency at which credential pairs of the probable credential dump appear in previously-identified (authentic) credential dumps. Each statistical observation states the total number of credential pairs that have previously seen, as well as the percentage of the hashes of block 672 that appear in a given previously-identified credential dump (along with the name and date of that particular previously-identified credential dump).

Some embodiments described herein relate to a computer storage product with a non-transitory computer-readable medium (which also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (which can also be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
a memory storing processor-executable instructions, a plurality of blacklist terms previously-identified as included in an inauthentic credential dump, and a plurality of credential dump records, each credential dump record from the plurality of credential dump records including an associated plurality of hashes; and
at least one processor, operably coupled to the memory and configured to execute the processor-executable instructions to:
receive repository data from a plurality of targeted remote repositories; determine the repository data omits each blacklist term from the plurality of blacklist terms;
in response to the determination that the repository data omits each blacklist term from the plurality of blacklist terms:
detect a common format and a common delimiter of the repository data;
identify a plurality of pairs of usernames and associated passwords of the repository data based on the common format and the common delimiter;
generate a hash for each pair of usernames and associated passwords from the plurality of pairs of usernames and associated passwords to produce a plurality of hashes;
compare the plurality of hashes to the plurality of hashes associated with the plurality of credential dump records stored in the memory to determine a percentage of the plurality of hashes that are not associated with the plurality of credential dump records;
identify the repository data as an authentic credential dump in response to the determination that the percentage is larger than a predetermined threshold; and
send a signal identifying an intrusion into a computer system associated with the repository data after the repository data is identified as an authentic credential clump; and
wherein the repository data is received from a first targeted remote repository of the plurality of targeted remote repositories, periodically, at a first rate that is a function of the first targeted remote repository, and the repository data is received from a second targeted remote repository of the plurality of targeted remote repositories, periodically, at a second rate that is a function of the second targeted remote repository.

2. The apparatus of claim 1, wherein the repository data is received from the plurality of targeted remote repositories, and the instruction to receive is performed repeatedly and at a predetermined rate.

3. The apparatus of claim 1, wherein the repository data is received from the plurality of targeted remote repositories when a change is detected at a targeted remote repository or the plurality of targeted remote repositories.

4. The apparatus of claim 1, wherein detecting the common delimiter of the repository data includes identifying a predetermined number of consecutive lines of the repository data that each include a common delimiter type, the detecting includes detecting the common delimiter when the predetermined number exceeds a threshold.

5. The apparatus of claim 1, wherein detecting the common format and the common delimiter of the repository data includes identifying a predetermined number of consecutive lines of the repository data in which respective usernames of the consecutive lines of the repository data are indexed at a common index position, and the detecting includes detecting the common format and the common delimiter when the predetermined number exceeds a threshold.

6. The apparatus of claim 1, wherein each pair of usernames and associated passwords from the plurality of pairs of usernames and associated passwords includes the associated username concatenated with the associated password.

7. The apparatus of claim 1, wherein each username of the plurality of pairs of usernames and associated passwords is an email address.

8. The apparatus of claim 1, wherein receiving repository data from the plurality of targeted remote repositories is performed using web scraping.

9. A method, comprising:
receiving, using a processor, remote source data from a plurality of targeted remote sources;
determining the remote source data omits each blacklist term from the plurality of blacklist terms;
in response to the determination that the remote source data omits each blacklist term from the plurality of blacklist terms:
storing a plurality of credential pairs of the remote source data, in a memory that is operably coupled to the processor;
detecting a format of the remote source data including identifying a plurality of usernames and the plurality of passwords;
normalizing, using the processor, the plurality of credential pairs into a concatenated, delimiter-free format, the normalizing being based on the plurality of usernames and the plurality of passwords;
converting, using the processor, the normalized plurality of credential pairs into a plurality of hashes,
comparing, using the processor, the plurality of hashes to previously-collected credential dump data to determine a percentage of the plurality of hashes that are not included in the previously-collected credential dump data;
identifying, using the processor, the remote source data as including an authentic credential dump in response to the determination that the percentage of the plurality of hashes that are not included in the previously-collected credential dump data, is larger than a predetermined threshold; and
sending a signal identifying an intrusion into a computer system associated with the remote source data after the remote source data is identified as including an authentic credential dump; and
wherein the receiving the remote source data includes receiving the remote source data from a first targeted remote source of the plurality of targeted remote sources, periodically, at a first rate that is a function of the first targeted remote source, and from a second targeted remote source, of the plurality of targeted remote sources periodically, at a second rate that is a function of the second targeted remote source.

10. The method of claim 9, wherein the detecting includes detecting a delimiter that recurs on a consecutive plurality of lines of the remote source data, the normalizing being based on the delimiter.

11. The method of claim 10, wherein:
each username of the plurality of usernames is disposed in the remote source data before a delimiter of the detected recurring delimiters; and
each password of the plurality of passwords is disposed in the remote source data after a delimiter of the detected recurring delimiters.

12. The method of claim 10, wherein:
each username of the plurality of usernames is disposed in the remote source data after a delimiter of the detected recurring delimiters; and
each password of the plurality of passwords is disposed in the remote source data before a delimiter of the detected recurring delimiters.

13. The method of claim 10, wherein each blacklist term from the plurality of blacklist terms being previously-identified as included in an inauthentic credential dump.

14. The method of claim 10, wherein the receiving the remote source data is performed repeatedly and at a predetermined rate.

15. A method, comprising:
storing a plurality of blacklist terms previously-identified as included in an inauthentic credential dump, and a plurality of credential dump records;
receiving, using a processor, remote source data from a plurality of targeted remote sources;
determining the remote source data omits each blacklist term from the plurality of blacklist terms;
in response to the determination that the remote source data omits each blacklist term from the plurality of blacklist terms:
storing, in a memory that is operably coupled to the processor, a plurality of credential pairs of the remote source data, each credential pair of the plurality of credential pairs including an associated username and an associated password;
comparing, using the processor, the plurality of credential pairs to previously-collected credential dump data to determine a percentage of the plurality of credential pairs that are not included in the previously-collected credential dump data;
identifying, using the processor, the remote source data as including an authentic credential dump in response to the determination that the percentage of the plurality of credential pans that are not included in the previously-collected credential dump data is larger than a predetermined threshold; and
sending a signal identifying an intrusion into a computer system associated with the remote source data after identifying the remote source data as including an authentic credential dump; and
wherein the receiving the remote source data includes receiving the remote source data from a first targeted remote source of the plurality of targeted remote sources, periodically, at a first rate that is a function of the first targeted remote source, and from a second targeted remote source of the plurality of targeted remote sources, periodically, at a second rate that is a function of the second targeted remote source.

16. The method of claim 15, wherein the receiving the remote source data is performed repeatedly and at a predetermined rate.

17. The method of claim 15, wherein the receiving the remote source data is performed using web scraping.

* * * * *